United States Patent
Zhao et al.

(10) Patent No.: US 8,778,216 B2
(45) Date of Patent: Jul. 15, 2014

(54) SLOW RELEASE ANTI-ICING MATERIAL FOR BITUMINOUS PAVEMENT AND PREPARATION METHOD THEREOF

(71) Applicant: Haiso Technology Co., Ltd, Hubei (CN)

(72) Inventors: Fan Zhao, Hubei (CN); Youkui Wang, Hubei (CN); Chong Duan, Hubei (CN); Song Liu, Hubei (CN); Wei Xiong, Hubei (CN)

(73) Assignees: Haiso Technology Co., Ltd, Wuhan, Hubei (CN); Hubei Expressway Business Development Co., Ltd, Wuhan, Hubei (CN)

( * ) Notice: Subject to any disclaimer, the term of this patent is extended or adjusted under 35 U.S.C. 154(b) by 0 days.

(21) Appl. No.: 14/099,420

(22) Filed: Dec. 6, 2013

(65) Prior Publication Data

US 2014/0091251 A1    Apr. 3, 2014

Related U.S. Application Data

(63) Continuation of application No. PCT/CN2013/072331, filed on Mar. 8, 2013.

(30) Foreign Application Priority Data

Mar. 9, 2012 (CN) .......................... 2012 1 0060962

(51) Int. Cl.
| | |
|---|---|
| *C09K 3/18* | (2006.01) |
| *C08L 33/08* | (2006.01) |
| *C08K 13/02* | (2006.01) |
| *C08K 3/32* | (2006.01) |
| *C08K 3/34* | (2006.01) |
| *C08K 5/098* | (2006.01) |
| *E01C 11/24* | (2006.01) |

(52) U.S. Cl.
CPC . *C09K 3/185* (2013.01); *C09K 3/18* (2013.01); *C08L 33/08* (2013.01); *C08K 13/02* (2013.01); *C08K 3/32* (2013.01); *C08K 3/34* (2013.01); *C08K 5/098* (2013.01); *E01C 11/245* (2013.01)
USPC ............................................. 252/70; 106/13

(58) Field of Classification Search
CPC .......... C09K 3/18; C09K 3/185; C08L 33/08; C08K 13/02; C08K 3/16; C08K 3/32; C08K 3/34; C08K 5/098; E01C 11/245

USPC ............................................... 252/70; 106/13
See application file for complete search history.

(56) References Cited

U.S. PATENT DOCUMENTS

| 4,012,537 A | 3/1977 | Dubois |
|---|---|---|
| 2003/0116749 A1 | 6/2003 | Suren et al. |

FOREIGN PATENT DOCUMENTS

| CN | 1456632 A | 11/2003 |
|---|---|---|
| CN | 101787215 A | 7/2010 |
| CN | 101787216 A | 7/2010 |
| CN | 101824326 A | 9/2010 |
| CN | 101948260 A | 1/2011 |
| CN | 102092978 A | 6/2011 |
| CN | 102173656 A | 9/2011 |
| CN | 102199398 A | 9/2011 |
| CN | 102604297 A | 7/2012 |
| JP | 7258629 A | 10/1995 |
| WO | 9743341 A1 | 11/1997 |

OTHER PUBLICATIONS

State Intellectual Property Office of the People's Republic of China, International Search Report, China, Jun. 13, 2013.
State Intellectual Property Office of the People's Republic of China, "Office Action", May 23, 2013.

*Primary Examiner* — Anthony J Green
(74) *Attorney, Agent, or Firm* — Tim Tingkang Xia, Esq.; Morris Manning & Martin LLP

(57) ABSTRACT

A slow release anti-icing material for a bituminous pavement and a method of manufacturing the same. The material includes X, Y and Z components. The X component is a chloride of 80-95 parts. The Y component comprises sodium silicate sodium gluconate and zinc dihydrogen phosphate. The Z component is an acrylate polymer obtained from polymerization of an acrylate monomer, as a cross-linking agent, and a hydrogen containing silicone oil. The manufacturing method includes preparing the X component, preparation the Y component, mixing the X component and the Y component evenly, and encapsulating the surface of the mixture of component X and Y by the component Z evenly through polymerization, to produce the slow release anti-icing material for a bituminous pavement. The anti-icing effects are remarkable for the bituminous pavement, and the material has effects of completely preventing the pavement from icing at −5 to 0° C.

7 Claims, 1 Drawing Sheet

SLOW RELEASE ANTI-ICING MATERIAL FOR BITUMINOUS PAVEMENT AND PREPARATION METHOD THEREOF

CROSS-REFERENCE TO RELATED APPLICATION

This application is a continuation application of International Patent Application No. PCT/CN2013/072331, filed Mar. 8, 2013, which itself claims the priority to Chinese Patent Application No. 201210060962.7, filed Mar. 9, 2012 in the State Intellectual Property Office of P.R. China, which are hereby incorporated herein in their entireties by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

The present invention relates generally to a slow release anti-icing material for a bituminous pavement, and more particularly to a slow release anti-icing material used in an upper layer of a bituminous pavement of an express way, and a preparation method thereof.

BACKGROUND OF THE INVENTION

In most of regions of China, it was cold in winter. Thus, especially in Yunnan province, Guizhou province, Sichuan province, Hubei province and Hunan province, a pavement is easy to ice in winter, affecting the anti-skid capability of the pavement, reducing traffic capacity, increasing a potential risk of traffic accidents, even causing traffic to be blocked in severe cases, and bringing about frightful troubles for normal travel of people and disturbance of normal living state of people. For the purpose of anti-skid effect, a conventional method involves spreading snow-melting agents for removal of snow and ice. Although it is capable of temporarily mitigating traffic and improving driving safety, it causes severe destruction and contamination on roadways and structures thereof, and surrounding environment such as soil and water bodies. If an anti-icing material which can actively inhibit icing on the pavement is developed, it would bring about favorable economic and social benefits in view of preventing roadway icing and enhancement of driving safety in winter.

With respect to chemical anti-icing materials for inhibition of pavement icing, as early as 1960s, an anti-icing salt called Verglimit was invented in Switzerland. Verglimit is a solid composite pavement anti-icing material derived by chemical processing of calcium chloride as a main ingredient, a small amount of sodium chloride and sodium hydroxide as an accessory ingredient, with linseed oil. The pavement anti-icing material was used in some trial pavements both in China and abroad, and had a certain anti-icing and anti-skid effect, but failed to be promoted in a large scale as a result of deficiencies. U.S. Pat. No. 6,982,044 discloses a method for encapsulating chlorate surface with thermo-sensitive phenolic resin. German Patent No. DE-OS 2426200, discloses a preparation method for modification of chloride with polyvinyl acetate, polyvinyl alcohol, epoxy or acrylic resins. In the foregoing patents, corrosion of steel bars by chloride ion was inevitable, and research on slow release materials was not disclosed. Accordingly, it is significant in economy to develop a slow release anti-icing material for the bituminous pavement having a relatively simple process for preparation and a low price without corroding the steel bars.

SUMMARY OF THE INVENTION

To solve the problem of corrosion of steel bars by chloride in the related art, in one aspect, the present invention is related to a slow release anti-icing material for a bituminous pavement that actively inhibits pavement icing and has an anti-corrosion effect, and a preparation method thereof.

In one embodiment of the present invention, a slow release anti-icing material for a bituminous pavement, essentially comprises X component, Y component and Z component. Parts by mass of these components are:

X component is chloride of 80-95 parts by mass;
Y component is an anti-corrosion agent, consisting of sodium silicate of 0.01-0.5 parts by mass, sodium gluconate of 0.01-0.5 parts by mass, and zinc dihydrogen phosphate of 0.01-0.5 parts by mass; and
Z component is an acrylate polymer of 5-10 parts by mass.

The chloride is one or a combination of two or more of sodium chloride, potassium chloride, calcium chloride and magnesium chloride. The acrylate polymer is polybutyl acrylate, polypropyl acrylate or polyisobutyl acrylate, obtained from polymerization of acrylate monomer, divinylbenzene as a cross-linking agent and hydrogen containing silicone oil in the presence of chloroplatinic acid as catalyst. Each of materials and its parts by mass in the polymerization are: the acrylate monomer of 5-10 parts, the cross-linking agent of 0.002-0.004 parts, the hydrogen containing silicone oil of 0.001-0.05 parts, the benzoyl peroxide initiator of 0.003-0.009 parts, and the chloroplatinic acid of 0.0005-0.001 parts. The hydrogen containing silicone oil includes hydrogen in a mass fraction of 0.01 wt %-0.2 wt %. The acrylate monomer is butyl acrylate, propyl acrylate or isobutyl acrylate.

In one embodiment, the chloride is in a form of particle with size of 0.1-5 mm.

In one embodiment, the sodium silicate is required to be white powder, with a passing rate of more than 80% through a 0.1 mm square mesh sieve.

In one embodiment, the sodium gluconate is required to be white powder, with a passing rate more than 90% through a 0.1 mm square mesh sieve.

In one embodiment, the zinc dihydrogen phosphate is required to be white powder, with a passing rate of more than 85% through a 0.1 mm square mesh sieve.

In one aspect, a method for preparing the slow release anti-icing material for the bituminous pavement according to the present invention includes the following steps.

1) Preparation the X component: granulation and molding of the chloride, to produce particles of 0.1-5 mm.

2) Preparation the Y component: mixing the sodium silicate of 0.01-0.5 parts, the sodium gluconate of 0.01-0.5 parts and the zinc dihydrogen phosphate of 0.01-0.5 parts with mechanical stirring at room temperature.

3) Mechanically mixing the granular chloride of 80-95 parts from step 1) with the Y component from step 2), on a basis of parts by mass.

4) Adding the mixture from step 3) to a 4-necked flask equipped with a thermometer, a stirrer and a refluxing condenser tube, adding petroleum ether of 100-300 parts as a reaction medium, stirring for 1-2 h at room temperature. Then adding the acrylate monomer of 5-10 parts, the cross-linking agent divinylbenzene of 0.002-0.004 parts, the initiator benzoyl peroxide of 0.002-0.006 parts, and reacting for 6-10 h at 60-80° C. Further adding the initiator benzoyl peroxide of 0.001-0.003 parts, the hydrogen containing silicone oil of 0.001-0.05 parts (including hydrogen in the mass fraction of 0.01 wt %-0.2 wt %), dropping a solution of chloroplatinic acid in isopropanol of 0.0005-0.001 parts as catalyst in 1-2 h, and continuing the reaction for 8-10 h. After recovering the solvent by filtration, drying in a vacuum for 3-4 h, the slow release anti-icing material for the bituminous pavement is produced. The acrylate monomer is butyl acrylate, propyl acrylate or isobutyl acrylate.

The X component is a principal component for preparing the anti-icing material, and it lowers the freezing point of road surface water by slowly releasing. The Y component is a ternary anti-corrosion agent, preventing corrosion of steel bars by chloride ion, and prolonging a service life of the roadways. The Z component is a layer of a uniform, compact, spatially reticular, thermostable, macromolecular coating material formed on the surface of the mixture of components X and Y, controlling a releasing rate thereof in the bituminous pavement.

In one aspect, the present application is related to a using of the anti-icing material product in the upper layer of the bituminous pavement.

In one embodiment, the using includes verifying indoor target mixing ratio for the anti-icing materials according to the additive addition method, and producing in bitumen mixing station according to production mixing ratio. The adding sequence is rock material→mineral powder→bitumen→anti-icing material. The anti-icing material is added in the amount of 5 wt %-8 wt % of bituminous concrete by mass. The wet mixing time for bitumen mixture is prolonged by 7-10 seconds prior to discharging. The construction process is the same as the routine construction method for bituminous concrete, with the field porosity being controlled within 3%-4%.

The anti-icing mechanism for the product according to the present invention is as follows.

In the upper layer of the bituminous pavement constructed with the product according to the present invention, as a result of loading effects such as wheel pressure, vibration, abrasion and the like, the anti-icing materials will migrate from varying depths by slow suction to the upper layer of pavement for release, by phenomena of porous osmotic pressure and capillary suction in pavement. At this point, the anti-icing material at about 5-10 mm in the upper layer of pavement is activated quickly, reacts with ice snow and dissolved quickly in water. As chloride ions in water increase, a vapor pressure of water in liquid phase is decreased, but a vapor pressure of solid ice is constant. According to a solid-liquid vapor pressure equilibrium principle in the ice water mixture, solid ice is melt into liquid water, thereby preventing and delaying pavement icing in winter.

The advantageous effects of the slow release anti-icing material for the bituminous pavement according to the present invention are: the components of the product are inexpensive, the production process is relatively simple, and the material is not corrosive to steel bars. The anti-icing effects are remarkable for the bituminous pavement, and the material has effects of completely preventing the pavement from icing at −5 to 0° C. In addition, the product does not corroding the steel bars, as verified by measurement according to JB/T 7901-1999 Metallic Material Uniform Corrosion Full Immersion Test Method in Lab, indicating that the product has a green environmental protection effect and is environmental-friendly.

These and other aspects of the present invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
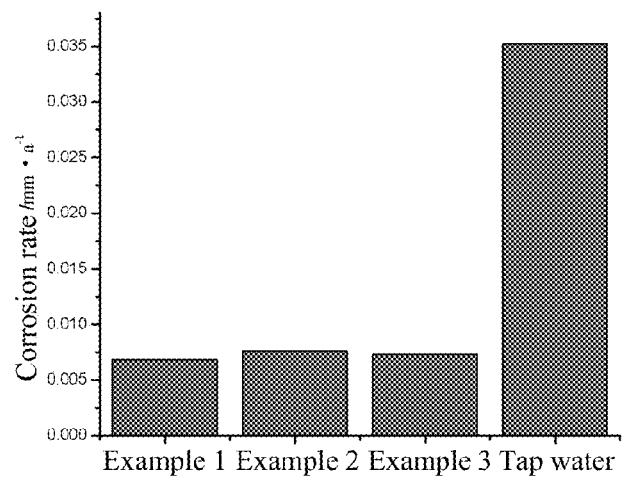
FIG. 1 is a comparison diagram of a corrosion rate of a slow release anti-icing material solution for a bituminous pavement according to one embodiment of the present invention and a corrosion rate of tap water to a sheet steel (corrosion time of 7 days).

While there has been shown several and alternate embodiments of the present invention, it is to be understood that certain changes can be made as would be known to one skilled in the art without departing from the underlying scope of the present invention as is discussed and set forth above and below including claims. Furthermore, the embodiments described above and claims set forth below are only intended to illustrate the principles of the present invention and are not intended to limit the scope of the present invention to the disclosed elements.

Embodiment 1

Preparation of a slow release anti-icing material for bituminous pavement

The material essentially comprises X component, Y component and Z component. Parts by mass of the components are as follows:

X component is calcium chloride, in a form of particle with size of 0.1-5 mm, of 92 parts;

Y component consisted of sodium silicate of 0.2 parts, sodium gluconate of 0.2 parts and zinc dihydrogen phosphate of 0.05 parts; and Z component is polybutyl acrylate, synthesized from butyl acrylate, cross-linking agent and hydrogen containing silicone oil.

The method for preparing the slow release anti-icing material for the bituminous pavement includes the following steps:

1. Preparing the X component: granulating and molding, to produce the granular chloride of 0.1-5 mm, of 92 parts.

2. Preparing the Y component: mixing sodium silicate of 0.01 parts, sodium gluconate of 0.2 parts and zinc dihydrogen phosphate of 0.05 parts by mechanical stirring at room temperature.

3. Mechanically mixing the granular chloride from step 1 with the Y component from step 2.

4. Adding the mixture from step 3 to a 4-necked flask equipped with a thermometer, a stirrer and a refluxing condenser tube, adding petroleum ether of 150 parts as a reaction medium, and stirring for 1-2 h at room temperature. Then adding the acrylate monomer of 7 parts, the cross-linking agent divinylbenzene of 0.002 parts, initiator benzoyl peroxide (BPO) of 0.003 parts, and reacting for 6-10 h at 60-80° C.

Further adding the initiator BPO of 0.001 parts, the hydrogen containing silicone oil of 0.002 parts (including hydrogen in the mass fraction of 0.01 wt %-0.2 wt %), dropping a solution of chloroplatinic acid in isopropanol of 0.0005 parts as catalyst for 1-2 h, and continuing the reaction for 8-10 h. After recovering the solvent by filtration, drying in a vacuum for 3-4 h, the slow release anti-icing material for the bituminous pavement is produced.

Embodiment 2

Preparation of a slow release anti-icing material for bituminous pavement

The material essentially includes X component, Y component and Z component. Parts by mass of the components are as follows.

X component is granular calcium chloride: calcium chloride of 0.1-5 mm, 82 parts; and magnesium chloride of 0.1-5 mm, 10 parts;

Y component consisted of sodium silicate of 0.1 parts, sodium gluconate of 0.1 parts and zinc dihydrogen phosphate of 0.25 parts; and Z component is polypropyl acrylate, synthesized from propyl acrylate, cross-linking agent and hydrogen containing silicone oil.

A method for preparing the slow release anti-icing material for the bituminous pavement is the same as that in Embodiment 1, except that propyl acrylate monomer is used instead of butyl acrylate monomer.

Embodiment 3

Preparation of a slow release anti-icing material for bituminous pavement

The material essentially comprises X component, Y component and Z component. Parts by mass of the components are as follows.

X component is granular chloride: calcium chloride of 0.1-5 mm, 75 parts; magnesium chloride of 0.1-5 mm, 10 parts; and sodium chloride of 0.1-5 mm, 7 parts;

Y component consisted of sodium silicate of 0.3 parts, sodium gluconate of 0.1 parts and zinc dihydrogen phosphate of 0.05 parts; and Z component is polyisobutyl acrylate, synthesized from isobutyl acrylate, the cross-linking agent and the hydrogen containing silicone oil.

The method for preparing the slow release anti-icing material for bituminous pavement is the same as that in Embodiment 1, except that isobutyl acrylate monomer was used, instead of butyl acrylate monomer.

Embodiment 4

Preparation of a slow release anti-icing material for bituminous pavement

The material essentially comprises X component, Y component and Z component. Parts by mass of the components are as follows.

X component was granular chloride: calcium chloride with 0.1-3 mm particle size, 17 parts; sodium chloride of 0.1-3 mm, 75 parts.

Y component consisted of sodium silicate of 0.05 parts, sodium gluconate of 0.15 parts and zinc dihydrogen phosphate of 0.1 parts; and Z component is polybutyl acrylate, synthesized from butyl acrylate, the cross-linking agent and the hydrogen containing silicone oil.

The method for preparing the slow release anti-icing material for bituminous pavement includes the following steps:

1. Preparing the X component: granulating and molding, to produce granular calcium chloride of 0.1-3 mm, 17 parts; granular sodium chloride of 0.1-3 mm, 75 parts.

2. Preparing the Y component: homogeneously mixing sodium silicate of 0.05 parts, sodium gluconate of 0.15 parts and zinc dihydrogen phosphate of 0.1 parts by mechanical stirring at room temperature.

3. Mechanically and homogeneously mixing the granular calcium chloride and sodium chloride from step 1 with the Y component from step 2.

4. Adding the mixture from step 3 to a 4-necked flask equipped with a thermometer, a stirrer and a refluxing condenser tube, adding petroleum ether of 100 parts as reaction medium, and stirring for 1-2 h at room temperature. Then adding the butyl acrylate monomer of 5 parts, the cross-linking agent divinylbenzene of 0.004 parts, the initiator benzoyl peroxide (BPO) of 0.005 parts, and reacting for 6-10 h at 60-80° C. Further adding the initiator benzoyl peroxide of 0.002 parts, the hydrogen containing silicone oil of 0.004 parts (comprising hydrogen in the mass fraction of 0.01 wt %-0.2 wt %), dropping a solution of chloroplatinic acid in isopropanol of 0.001 parts as catalyst for 1-2 h, and continuing the reaction for 8-10 h. After recovering the solvent by filtration, drying under vacuum for 3-4 h, the slow release anti-icing material for bituminous pavement is produced.

For each of materials in the embodiment, dosage of each of parts is measured as 1 kg.

Embodiment 5

Preparation of a slow release anti-icing material for bituminous pavement

The material essentially comprises X component, Y component and Z component. Parts by mass of the components are as follows:

X component is granular chloride: calcium chloride with 0.1-3 mm particle size, 40 parts; sodium chloride of 0.1-3 mm, 40 parts;

Y component consisted of sodium silicate of 0.5 parts, sodium gluconate of 0.5 parts and zinc dihydrogen phosphate of 0.5 parts;

Z component is polyisobutyl acrylate, synthesized from isobutyl acrylate, the cross-linking agent and the hydrogen containing silicone oil.

The method for preparing the slow release anti-icing material for bituminous pavement includes the following steps:

1. Preparing the X component: granulating and molding, to produce granular calcium chloride of 0.1-3 mm, 40 parts; granular sodium chloride of 0.1-3 mm, 40 parts.

2. Preparing the Y component: homogeneously mixing sodium silicate of 0.5 parts, sodium gluconate of 0.5 parts and zinc dihydrogen phosphate of 0.5 parts by mechanical stirring at room temperature.

3. Mechanically and homogeneously mixing the granular calcium chloride and sodium chloride from step 1 with the Y component from step 2.

4. Adding the mixture from step 3 to the 4-necked flask equipped with a thermometer, a stirrer and a refluxing condenser tube, adding petroleum ether of 300 parts as reaction medium, and stirring for 1-2 h at room temperature. Then adding the isobutyl acrylate monomer of 9 parts, the cross-linking agent divinylbenzene of 0.003 parts, the initiator benzoyl peroxide of 0.006 parts, and reacting for 6-10 h at 60-80° C. Further adding the initiator benzoyl peroxide of 0.003 parts, the hydrogen containing silicone oil of 0.04 parts (comprising hydrogen in the mass fraction of 0.01 wt %-0.2 wt %), dropping a solution of chloroplatinic acid in isopropanol of 0.001 parts as catalyst for 1-2 h, and continuing the reaction for 8-10 h. After recovering the solvent by filtration, drying under vacuum for 3-4 h, the slow release anti-icing material for bituminous pavement is produced.

For each of materials in the embodiment, dosage of each of parts is measured as 1 kg.

Efficacy Assessment 1. 5.5 g anti-icing materials prepared in Embodiments 1, 2 and 3 are respectively dissolved in 100 g water to form a solution. Corrosion rate of the produced solution to sheet steel is measured according to JB/T 7901-1999 Metallic Material Uniform Corrosion Full Immersion Test Method in Lab. Corrosion of the solution vs. tap water to sheet steel at day 7 is shown in FIG. 1. It is indicated in FIG. 1 that the anti-icing material had no corrosion to sheet steel and had favorable environmental benefit.

Figure 2:
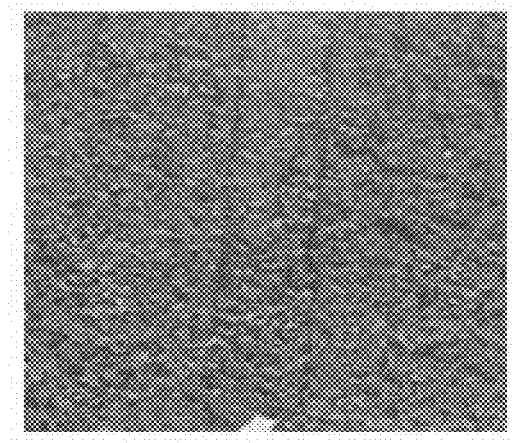
FIG. 2 is a photograph of a rut specimen added with an anti-icing material.
Figure 3:
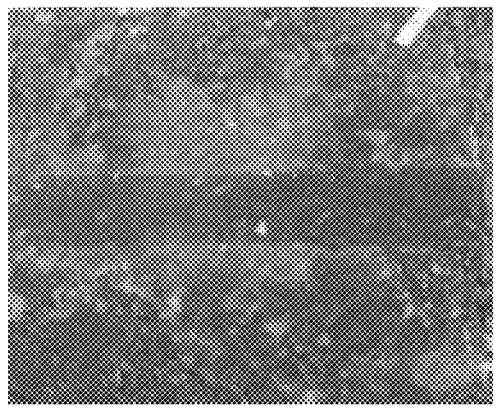
FIG. 3 is a photograph of a rut specimen without an anti-icing material.

2. The anti-icing materials prepared in Embodiments 1, 2, 3, 4 and 5 are added into a bitumen mixture in an amount of 5 wt %-8 wt %. Rut specimen is molded with or without addition of the anti-icing material in laboratory. Water is sprayed onto the surface of rut specimen, and then the specimen is placed into a cryo-freezer at −5° C. and frozen for 10 h, allowing the surface of the specimen to ice up. From the testing results, it is seen that no icing is occurred on the surface of the bitumen mixture added with the anti-icing material, and obvious ice layer is found on the surface of the bitumen mixture without addition of the anti-icing material. In the experiments above, it is suggested that the anti-icing materials had favorable anti-icing effect at −5° C. The results are shown in FIGS. 2 and 3.

3. The anti-icing materials prepared in Embodiments 1, 2, 3, 4 and 5 are added into a bitumen mixture in an amount of 5 wt %-8 wt %. The anti-icing material is added in laboratory to mold rut specimen. In order to demonstrate the slow release property of the anti-icing material in the bitumen mixture, the molded rut specimen is exposed to the sun and rain in open air. The liquid layer on the surface of the specimen after raining is tested for chloride ion concentration at varying interval, thereby assessing the slow release property of the anti-icing material.

The results from assessment and testing were given in Table 1.

TABLE 1 results from assessment and testing

| Name | Assessment of anti-icing efficacy | Level of chloride ion released from the specimen at varying interval (g/m$^2$) 0 d | Level of chloride ion released from the specimen at varying interval (g/m$^2$) 50 d | Level of chloride ion released from the specimen at varying interval (g/m$^2$) 100 d | Level of chloride ion released from the specimen at varying interval (g/m$^2$) 150 d | Level of chloride ion released from the specimen at varying interval (g/m$^2$) 200 d | Level of chloride ion released from the specimen at varying interval (g/m$^2$) 250 d | Level of chloride ion released from the specimen at varying interval (g/m$^2$) 300 d |
|---|---|---|---|---|---|---|---|---|
| Blank | Icing on surface | 0.01 | 0 | 0 | 0 | 0 | 0 | 0 |
| The anti-icing material from Example 1 | No icing on surface | 56.8 | 53.3 | 51.8 | 48.6 | 46.5 | 45.1 | 44.6 |
| The anti-icing material from Example 2 | No icing on surface | 58.1 | 55.6 | 52.9 | 50.5 | 48.7 | 46.4 | 45.0 |
| The anti-icing material from Example 3 | No icing on surface | 57.3 | 54.1 | 52.4 | 50.1 | 47.8 | 46.2 | 43.9 |
| The anti-icing material from Example 4 | No icing on surface | 60.3 | 56.1 | 54.4 | 52.1 | 50.8 | 49.2 | 48.6 |
| The anti-icing material from Example 5 | No icing on surface | 65.6 | 62.1 | 60.1 | 59.4 | 56.4 | 54.8 | 52.7 |

It is indicated from table 1 that, the anti-icing materials from Embodiments 1, 2, 3, 4 and 5 have excellent anti-icing effect. Moreover, upon exposure of the specimen to the sun and rain in the open air for a long time, although the escaping rate of chloride ions in the bitumen mixture tended to decline, the loss rate of chloride ions is low, indicating that the chloride covered by the acrylate polymer has slow release performance and persisted for a long time.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A slow release anti-icing material for a bituminous pavement, comprising an X component, a Y component and a Z component, wherein the X component is chloride of 80-95 parts;
the Y component is an anti-corrosion agent, comprising sodium silicate of 0.01-0.5 parts by mass, sodium gluconate of 0.01-0.5 parts by mass and zinc dihydrogen phosphate of 0.01-0.5 parts; and the Z component is an acrylate polymer of 5-10 parts;

wherein the chloride is at least one of sodium chloride, potassium chloride, calcium chloride and magnesium chloride;

wherein the acrylate polymer is polybutyl acrylate, polypropyl acrylate or polyisobutyl acrylate, and is obtained from polymerization of an acrylate monomer, divinylbenzene as a cross-linking agent, and a hydrogen containing silicone oil in the presence of chloroplatinic acid as a catalyst; and wherein in the polymerization, each of the materials and its parts by mass are as follows: the acrylate monomer of 5-10 parts, the cross-linking agent of 0.002-0.004 parts, the hydrogen containing silicone oil of 0.001-0.05 parts, initiator benzoyl peroxide of 0.003-0.009 parts, and the chloroplatinic acid of 0.0005-0.001 parts, and wherein the hydrogen containing silicone oil comprises hydrogen at a mass fraction of 0.01 wt %-0.2 wt %, and the acrylate monomer is butyl acrylate, propyl acrylate or isobutyl acrylate.

2. The slow release anti-icing material according to claim 1, wherein the chloride is in a form of particle with a size of 0.1-5 mm.

3. The slow release anti-icing material according to claim 1, wherein the sodium silicate is in a form of white powder, with a passing rate of greater than 80% through a 0.1 mm square mesh sieve.

4. The slow release anti-icing material according to claim 1, wherein the sodium gluconate is in a form of white powder, with a passing rate of greater than 90% through a 0.1 mm square mesh sieve.

5. The slow release anti-icing material according to claim 1, wherein the zinc dihydrogen phosphate is in a form of white powder, with a passing rate of greater than 85% through a 0.1 mm square mesh sieve.

6. A method for preparing the slow release anti-icing material according to claim 1, comprising:

1) preparing the X component, comprising:
granulating and molding the chloride to produce granular particles of 0.1-5 mm;

2) preparing the Y component, comprising:
mixing the sodium silicate of 0.1-0.5 parts, the sodium gluconate of 0.01-0.5 parts, the zinc dihydrogen phosphate of 0.01-0.5 parts by mechanical stirring at room temperature;

3) mechanically mixing the granular chloride of 80-95 parts from step 1) with the Y component of 7 parts from step 2), on a basis of parts by mass to form a mixture; and 4) adding the mixture from step 3) to a 4-necked flask equipped with a thermometer, a stirrer and a refluxing condenser tube;

adding petroleum ether of 100-300 parts as a reaction medium, and stirring for 1-2 h at room temperature;

adding an acrylate monomer of 5-10 parts, a cross-linking agent divinylbenzene of 0.002-0.004 parts, the initiator benzoyl peroxide of 0.002-0.006 parts, and reacting for 6-10 h at 60-80° C.;

adding the initiator benzoyl peroxide of 0.001-0.003 parts, a hydrogen containing silicone oil of 0.001-0.05 parts (comprising hydrogen in a mass fraction of 0.01 wt %-0.2 wt %), dropping a solution of chloroplatinic acid in isopropanol of 0.0005-0.001 parts as catalyst in 1-2 h, and continuing the reaction for 8-10 h; and recovering the solvent by filtration, and drying in a vacuum for 3-4 h, to produce the slow release anti-icing material for bituminous pavement, wherein the acrylate monomer is butyl acrylate, propyl acrylate or isobutyl acrylate.

7. A method for using the slow release anti-icing material for the bituminous pavement according to claim 1, wherein the anti-icing material is used in an upper layer of the bituminous pavement, and wherein the method of using comprises:

verifying an indoor target mixing ratio for the anti-icing materials;

producing bituminous concrete in a bitumen mixing station according to the verified indoor target mixing ratio, wherein a material adding sequence in the producing step is: rock material→mineral powder→bitumen→the anti-icing material, wherein the anti-icing material is added in an amount of 5 wt %-8 wt % of the bituminous concrete by mass, a wet mixing time for a bitumen mixture is prolonged by 7-10 s prior to discharging, a construction process is the same as a routine construction for the bituminous concrete, with a field porosity being controlled between 3%-4%.

* * * * *